United States Patent [19]

Stamhuis et al.

[11] Patent Number: 5,036,138

[45] Date of Patent: Jul. 30, 1991

[54] ELASTOMERIC COMPOSITIONS, PROCESS FOR THE PREPARATION THEREOF AND TIRES CONTAINING THEM

[75] Inventors: Jan E. Stamhuis; Antonius A. Broekhuis; Pieter Luijk, all of CM Amsterdam, Netherlands

[73] Assignee: Shell Oil Company, Houston, Tex.

[21] Appl. No.: 255,240

[22] Filed: Oct. 11, 1988

[30] Foreign Application Priority Data

Oct. 19, 1987 [GB] United Kingdom ............. 8724437

[51] Int. Cl.$^5$ .................. C08L 9/06; C08L 25/10; C08L 53/02

[52] U.S. Cl. ..................... 525/99; 525/192; 525/194; 525/237; 525/316; 525/941; 152/209 R

[58] Field of Search ............. 525/237, 99; 152/209 R

[56] References Cited

U.S. PATENT DOCUMENTS

| | | | |
|---|---|---|---|
| 4,383,085 | 5/1983 | Fujimati et al. | 525/237 |
| 4,471,093 | 9/1984 | Furukawa et al. | 525/237 |
| 4,485,205 | 11/1984 | Fujimati et al. | 525/237 |
| 4,510,291 | 4/1985 | Kawakami | 152/209 R |
| 4,515,922 | 5/1985 | Sakakibara et al. | 525/99 |
| 4,567,225 | 1/1986 | Misawa et al. | 525/237 |
| 4,748,168 | 5/1988 | Kawakami et al. | 525/237 |

FOREIGN PATENT DOCUMENTS

| | | |
|---|---|---|
| 1283327 | 4/1971 | United Kingdom . |
| 2068979A | 8/1981 | United Kingdom . |

Primary Examiner—Carman J. Seccuro

[57] ABSTRACT

The present invention relates to an elastomeric composition suitable for tire treads comprising (1) 10–90% wt of a copolymer of a mono-aromatic vinyl compound and having a vinyl content of <50% wt and a Tg<−35 degree C., and (2) 90–10% wt of a hompolymer of a conjugated diene or a copolymer of a mono-aromatic vinyl compound and a conjugated diene, containing <25% wt of mono-aromatic vinyl compound and having a vinyl content <25% wt and a Tg<−55 degree C., both polymer having a differential content of mono-aromatic vinyl compound which is <5 percentage points.

8 Claims, No Drawings

ELASTOMERIC COMPOSITIONS, PROCESS FOR THE PREPARATION THEREOF AND TIRES CONTAINING THEM

BACKGROUND OF THE INVENTION

The invention relates to elastomeric compositions suitable for use in the tread portion of a pneumatic tire, to a process for the preparation of said elastomeric compositions, to unvulcanized elastomeric compositions containing said elastomeric compositions and to tires containing the elastomeric compositions in a vulcanized state.

Tires containing elastomeric compositions in a vulcanized state should have a low rolling resistance for low fuel consumption, a high wet grip performance for good running safety of automobiles and a high resistance against abrasion. Two general classes of tread compounds can be distinguished:
(a) those giving high wet grip performance combined with high heat build-up characteristics, relatively high rolling resistance, a low resistance against abrasion and having a glass transition temperature above minus 55° C., and
(b) those giving relatively low wet grip performance combined with low heat build-up characteristics, relatively low rolling resistance, a high resistance against abrasion and having a glass transition temperature below minus 65° C.

From the above it follows that it is difficult to combine a low rolling resistance with a high wet grip performance.

British patent specification No. 2,068,979 concerns rubber compositions comprising (A) from 10 to 90% by weight of a random styrene-butadiene copolymer having a bound styrene content of from 3 to 30% by weight and a butadiene portion which has a 1,2 content of from 60 to 95% by weight, said copolymer being obtained by polymerization in the presence of an organo-alkali metal catalyst, and (B) from 90 to 10% by weight of at least one rubber having a glass transition temperature not higher than minus 40° C., said rubber being natural rubber, polyisoprene rubber, styrene-butadiene copolymer rubber or polybutadiene rubber.

"Random" according to British patent specification No. 2,068,979, refers to a styrene-butadiene copolymer, the bound styrene of which contains 10% by weight or less of block styrene. The random styrene-butadiene copolymer (A) can be prepared, for example, by polymerizing styrene and butadiene in a hydrocarbon solvent in the presence of an additive such as an ether or a tertiary amine and using an organolithium compound as initiator. Pneumatic tire treads made from such compositions have improved wet skid and heat build-up properties.

U.S. Pat. No. 4,485,205 concerns elastomeric compositions suitable for use in the tread portion of a pneumatic tire. These known compositions comprise (1) a butadiene-styrene copolymer rubber containing 3-30% by weight of bound styrene and having a vinyl content in the conjugated diene units of not less than 60% by weight and a glass transition temperature of $-35°$ C. to $0°$ C., and (2) a diene rubber having a glass transition temperature of lower than $-60°$ C. The two components are not compatible, i.e. the glass transition temperatures of these rubbers appear separately, i.e. they are not united.

According to Example 1 in said specification the copolymers were prepared by polymerization using n-butyllithium as a catalyst and potassium dodecylbenzenesulphonate and diethylene glycol dimethyl ether as a modifier in a toluene solvent at constant temperature. Pneumatic tire treads made from such compositions have a low rolling resistance, a high wet grip performance and a high resistance against abrasion.

A disadvantage of the tires manufactured from the known elastomeric compositions described hereinbefore is that their winter performance is relatively poor, which follows from their relatively high Shore hardness at a temperature of minus 10° C. The known tires, therefore, have a relatively poor grip on snow and ice.

SUMMARY OF THE INVENTION

It has now surprisingly been found that when the copolymerized monomers are statistically distributed over the chain of the copolymer, the vulcanized compositions have an enhanced winter performance, whilst the low rolling resistance, high wet grip performance and high resistance against abrasion are maintained.

Accordingly, the invention provides an elastomeric composition suitable for use in the tread portion of a pneumatic tire, said composition comprising:
(1) in the range of from 10 to 90% by weight of a copolymer A of a mono-aromatic vinyl compound and a conjugated diene and having a content of mono-aromatic vinyl compound in the range of from 10 to 40% by weight, a vinyl content in the conjugated diene units of at least 50% by weight, calculated on total conjugated diene units, and a glass transition temperature above minus 35° C., and
(2) in the range of from 90 to 10% by weight of a polymer B which is a homopolymer of a conjugated diene or a copolymer of a mono-aromatic vinyl compound and a conjugated diene, said polymer B containing less than 25% by weight of mono-aromatic vinyl compound and having a vinyl content in the conjugated diene units of less than 25% and a glass transition temperature below minus 55° C., said percentages by weight of copolymer A and polymer B being calculated on the total of A and B, and copolymer A and polymer B, if present as a copolymer, having a differential content of the mono-aromatic vinyl compound over the polymer chain which varies less than five percentage points, as determined by monomer conversion.

DETAILED DESCRIPTION OF THE INVENTION

Copolymer A and polymer B, if present as a copolymer, in the compositions according to the present invention, are statistical, that is to say, the composition does not substantially vary, i.e. the differential content of the aromatic vinyl compound over the polymer chain varies less than five percentage points, as determined by monomer conversion. Preferably, the differential content of the mono-aromatic vinyl content over the polymer chain varies less than two percentage points.

It is a feature of the present elastomeric compositions that copolymer A and polymer B are partially compatible with each other, that is to say, that the tan δ-temperature curve of the elastomeric composition in the vulcanized state usually shows a flat and broad maximum. The value for tan δ gives the tangent of the loss angle, also referred to as "loss factor"; for an explanation reference is made to "Handbook of Plastics Test Methods", edited by R. P. Brown, 1981, Chapter Nine.

Preferred elastomeric compositions contain in the range of from 20 to 50% by weight of copolymer A and 80 to 50% by weight of polymer B, calculated on the total of A and B.

The mono-aromatic vinyl compound is suitably styrene, but may be, for example, 3,5-diethylstyrene, 4-n-propylstyrene, 2,4,6-trimethylstyrene, 4-phenylstyrene or 4-methylstyrene. Where, for example, branching or cross-linking is desired a polyfunctional mono-aromatic vinyl compound can be used, for example a divinylbenzene.

The conjugated diene is one capable of co-polymerization with styrene or with another mono-aromatic vinyl compound and such that, when polymerized with styrene or another selected mono-aromatic vinyl compound or compounds, it provides a polymer having desired elastomeric properties. The diene is preferably 1,3-butadiene, but may be another diene, for example 1,3-pentadiene, 2-methyl-1,3-butadiene (isoprene), 2,3-dimethyl-1,3-butadiene, 2-methyl-1,3-pentadiene or 2,3-dimethyl-1,3-pentadiene.

Very good results have been obtained with copolymer A being derived from styrene and 1,3-butadiene and polymer B from 1,3-butadiene or from styrene and 1,3-butadiene.

The term "vinyl content" as used herein refers to that portion by weight of the conjugated diene component of the copolymer which has polymerized at the 1,2-positions. When the diene is 1,3-butadiene the 1,2-polymerization results in the formation of pendant vinyl groups; where the diene is other than 1,3-butadiene corresponding pendant groups are produced by 1,2- or 3,4-polymerization. Copolymer A preferably has a vinyl content in the conjugated diene units in the range of from 60 to 90% by weight, calculated on total conjugated diene units. Polymer B preferably has a vinyl content below 15% by weight.

According to a preferred embodiment of the present invention copolymer A and polymer B are present as separate polymers, i.e. not chemically bound to each other. Alternatively, they are chemically bound to each other, forming one polymer molecule comprising one or more blocks of copolymer A and one or more blocks of polymer B. In the latter case, the polymer molecule may be represented, for example, by the general formulae

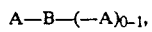

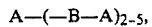

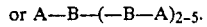

It will be understood that these general formulas have been written to include either sequentially formed species or species that have been formed, at least in part, by the use of coupling agents. In the latter instance, any residue of the coupling agents has been ignored as an insignificant part of the general formula for high molecular weight polymers. When the subscript is zero in the formula A—B—(—A)$_{0-1}$ the polymer A—B is meant; and when the subscript is 1, the A—B—A structure of linear form is intended. Branched structures are designated by the other formulae in which the subscript is between 2 and 5; for example, where a tetrafunctional coupling agent is used, the structure of a polymer of the formula

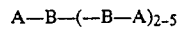

would be represented by:

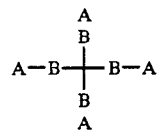

The glass transition temperature ($T_g$) is the value found by means of differential scanning calorimetry. Preferably, the glass transition temperature of copolymer A is in the range of from minus 25° C. to plus 25° C. and that of polymer B below minus 65° C.

The elastomeric compositions according to the present invention may be compounded with the usual compounding ingredients, such as vulcanizing agents, vulcanization accelerating agents, vulcanization activating agents, antioxidants, fillers and extender oils which may be naphthenic, paraffinic or, which is preferred, aromatic. The preferred vulcanizing agent is sulphur and the preferred filler is carbon black; the curve representing tan δ of the vulcanized compositions as a function of the temperature is determined using an aromatic extender oil, carbon black as a filler and sulphur as a vulcanizing agent. The carbon black is preferably present in an amount in the range of from 20 to 120 parts by weight, calculated on 100 parts by weight of the sum of copolymer A and polymer B. Sulphur is preferably present in an amount in the range of from 0.5 to 5 parts by weight, calculated on 100 parts by weight of the sum of copolymer A and polymer B. Other examples of vulcanizing agents are 4,4'-dithiomorpholine and alkylphenol disulphides. The elastomeric compositions may further contain other inorganic fillers, for example silica, bentonite, clay, titanium oxide, talc, diatomaceous earth, chalk and china clay. Examples of vulcanization activating agents which may be present are zinc oxide and stearic acid. Examples of antioxidants which may be present are N,N'-bis(1,4-dimethylphenyl)-p-phenylenediamine, N-phenyl-N'-isopropyl-p-phenylenediamine, phenyl-β-naphthylamine and 2-mercaptobenzimidazole. Examples of vulcanization accelerating agents are 2-(4-morpholinyl-mercapto)-benzothiazole and N-cyclohexyl-2-benzothiazyl sulphenamide.

The invention further provides a process for the preparation of an elastomeric composition suitable for the use in the tread portion of a pneumatic tire which process comprises mixing (1) in the range of from 10 to 90% by weight of a copolymer A of a mono-aromatic vinyl compound and a conjugated diene and having a content of aromatic vinyl compound in the range of from 10 to 40% by weight, a vinyl content in the conjugated diene units of at least 50% by weight, calculated on total conjugated diene units, and a glass transition temperature above minus 35° C., and (2) in the range of from 90 to 10% by weight of a polymer B which is a homopolymer of a conjugated diene or a copolymer of a mono-aromatic vinyl compound and a conjugated diene, said polymer B containing less than 25% by weight of a mono-aromatic vinyl compound and having a vinyl content in the conjugated diene units of less than 25% and a glass transition temperature below minus 55° C.,
said percentages by weight of copolymer A and polymer B being calculated on the total of A and B, and copolymer A and polymer B, if present as a copolymer, having a differential content of the aromatic vinyl compound over the polymer chain which varies less than five percentage points, as determined by monomer conversion.

The statistical distribution of the copolymerized monomers over the chain of the copolymers can be achieved in any desired manner, but preferably according to the process described in British patent specification No. 1,283,327. Therefore, according to a preferred embodiment of the present invention, copolymer A and polymer B, if a copolymer, have been prepared by batch copolymerization of a conjugated diene and a monoaromatic vinyl compound in the presence of a liquid diluent and with the aid of an initiator based on lithium, in which embodiment (a) first a starting mixture is prepared from the diluent and part of the totally needed quantity of each of the monomers,
(b) subsequently the copolymerization is initiated by contacting this mixture with the initiator, and
(c) during copolymerization the monomer ratio in the reaction mixture is kept constant (as hereinafter defined) by addition of the remaining part of each of the monomers.

The term "constant" mentioned under (c) hereinbefore includes "substantially constant", by which should be understood that the monomer weight ratio during the copolymerization should increase or decrease by that percentage so as to yield a differential content of the aromatic vinyl compound over the polymer chain which varies less than five percentage points, as determined by monomer conversion. In step (b) as a rule the totally needed quantity of initiator is added to the mixture mentioned under (a) under homogenization in a comparatively short time. Usually the moment at which step (c) is started approximately coincides with that at which the addition of initiator is stopped, but it may be a little earlier or later.

The copolymerization reaction is preferably discontinued as soon as the addition mentioned under (c) has been completed. As a rule the reaction is discontinued by means of substances which "kill" the living polymer; this can be a proton-releasing compound, for instance water, an alcohol, an amine or a protonic acid, or, which is preferred, a coupling agent. The coupling can be effected conveniently by use of a difunctional coupling agent, for example 1,2-dibromoethane or a diisocyanate, providing a linear coupled copolymer, or a tri-, tetra- or other polyfunctional coupling agent, for example the tetra-functional compounds silicon tetrachloride, stannic chloride, dimethyl adipate and diethyl adipate provide a non-linear or branched coupled copolymer. Where the coupling is only partly complete, for example at 50% of the theoretical amount, the product of the coupling reaction consists partly of coupled block copolymer and partly of uncoupled block copolymer.

Consequently, two different preselected monomer ratios are applied: the monomer ratio in the mixture prepared beforehand in which the copolymerization is initiated and that in which the monomers are supplied after the initiation of the copolymerization. The monomer suppletion can take place by addition either of the monomers as a mixture prepared beforehand, or of each monomer separately. In the present process the addition can also be carried out continuously or portion-wise. As a result of the measures mentioned, during the polymerization not only the monomer ratio in the reactor is kept constant or substantially constant, but also a decrease in concentration of the mono-aromatic vinyl compound is counteracted, which facilitates the control of the process.

It is recommended that less than 90% by weight of the totally needed quantity of the aromatic vinyl compound be used in the preparation of the starting mixture, the application of quantities smaller than 50% by weight of the totally needed quantity of the aromatic vinyl compound being particularly preferred.

Also, special preference is given to the addition of the remaining part of each of the monomers during the copolymerization at a rate equal to the rate at which the concerning monomer is consumed. Here "equal" includes "substantially equal", by which should be understood that the rate is such so as to yield a differential content of the aromatic vinyl compound over the polymer chain which varies less than five percentage points, as determined by monomer conversion. Fulfilment of this condition results in that in the reactor not only the monomer ratio, but also the absolute quantity of each of the monomers remains constant or substantially constant. In this case the decrease of the monomer concentration does not exceed a value determined by the increase of the polymer concentration. Under these conditions the rate at which the copolymers are applied during the copolymerization can be kept constant or substantially constant at a value calculated beforehand and the heat development also remains constant or substantially constant throughout the polymerization.

In certain cases, when the circumstances are such that vapour lock can occur in the head of the monomer pump when using a low-boiling monomer, for instance butadiene, it is possible, in order to avoid this phenomenon, to supply the concerning monomer, or the monomer mixture in which it is contained, dissolved in a not too large amount of the liquid diluent. It is true that this causes an extra decrease in monomer concentration during the copolymerization, but this extra concentration decrease can be kept very small. Preferably, however, during the monomer suppletion no liquid diluent is added at the same time.

In addition, in the process it is also possible to keep the concentration of each of the monomers constant. This can be attained, for instance, when during the polymerization each of the monomers is added, according to a certain scheme, at a rate higher than that at which it is consumed.

If required, in the process the monomer concentration in the reactor can be controlled by means of gas-liquid chromatography.

As the process can also be applied at a relatively high monomer concentration, there is no need to carry out the copolymerization at a high temperature. Therefore temperatures below 150° C. are preferred and as a rule particular preference will be given to copolymerization at a temperature of below 110° C., most preference being given to temperatures between 30° and 100° C. In addition it is recommended that the temperature be kept constant or substantially constant. However, it is also possible to gradually increase or decrease the temperature during the polymerization.

The preferred diene/aromatic vinyl compound weight ratio in the mixture in which the copolymerization reaction is initiated amounts to from 50:50 to 5:95.

Though in principle in the mixture in which the copolymerization is initiated any monomer concentration can be applied, preferably a total amount of monomer of at least 0.05% by weight is used, total amounts of from 0.1 to 10.0% by weight being particularly recommended.

In addition it is desirable that throughout the process the reaction mixture is intensively homogenized. As a rule the homogenization is brought about by means of an intensively working stirrer. As an initiator based on lithium can for instance be applied: metallic lithium, alkyllithium compounds, such as methyllithium, isopropyllithium, n-butyllithium, sec-butyllithium, amyllithium, 2-ethylhexyllithium, phenyllithium, ethylenedilithium, trimethylenedilithium, pentamethylenedilithium, 1,4-dilithiobenzene, 1,5-dilithiobenzene, 1,5-dilithionaphthalene and 1,3,5-trilithiumpentane.

The amount of initiator may vary within wide limits. In general 0.001–1.0 g of metallic or bound lithium per 100 g of monomer is applied.

If required, the copolymerization can be carried out in the presence of a slight amount of divinylbenzene or other substance that causes branching or cross-linking of the copolymer, prior to, together with, or subsequent to the use of a coupling agent, such as silicon tetrachloride, stannic chloride, a dihalogen hydrocarbon, a monoester such as ethyl acetate, ethyl acrylate, or phenyl benzoate, or a diester, obtained by the reaction of a dicarboxylic acid with a monovalent alcohol, such as diethyl adipate. In addition the process can be applied in combination with the use of polar organic compounds, for example as described in the British patent specification No. 884,490, which modify the initiator in such a way that statistic copolymerization is promoted. In this way, the microstructure of the diene part of the copolymer is also changed to the effect that the percentage of 1,2-addition structure increases.

Suitable examples of diluents are aliphatic and aromatic hydrocarbons, such as pentane, hexane, heptane, petroleum ether, benzene, cyclopentane, cyclohexane, xylene, isooctane, 2-butene, 2-methyl-1-butene or mixtures of two or more of these hydrocarbons. As a rule diluents are used in which the copolymers formed dissolve.

The invention is further illustrated by means of the following Examples.

The trade names used in the Examples and Comparative Experiments have the following signification:

"Dutrex" is an aromatic extender oil having a density 20/4° C. of 0.996, carbon atoms in aromatic structure 40%, in naphthenic structure 34% and in paraffinic structure of 26%, and a kinematic viscosity at 37.8° C. and 100° C. of 727 mm²/s and 17.3 mm²/s, respectively.

"Carbon black ISAF N220" is an intermediate superabrasion furnace black according to ASTM method D 1765.

"Santoflex 13" is N-(1,3-dimethylbutyl)-N'-phenyl-p-phenylenediamine, an antidegradant.

"Santocure CBS" is N-cyclohexyl-2-benzothiazylsulphenamide, an accelerator.

The curves representing tan δ of the vulcanized compositions as a function of the temperature were determined over a temperature range of minus 100° C. to plus 100° C. at a strain amplitude of 0.5% and a frequency of 10 Hz. A rectangular strip specimen having a length of 35 mm, a width of 12.7 mm and a thickness of 2.1 mm was used.

The wet grip performance was assessed from dynamic mechanical measurements on cylindrical specimens having a height of 6 mm and a diameter of 6 mm, determining the ratio between the loss modulus and storage shear modulus at 0° C., 1.5 Hz and 0.5% strain amplitude.

The rolling resistance was measured on samples with the same geometry determining the ratio between the loss modulus and storage shear modulus at 50° C., 10 Hz and 2% strain amplitude.

The apparatus used for both measurements was a Rheometrics dynamic mechanical spectrometer, type system 4.

The values for tan δ were calculated as the ratio of loss modulus and storage shear modulus. The rolling resistance Rc was calculated by means of the following equation:

$$Rc = 26.25\, G'' + \frac{0.277 \times G''}{(G^*)^2} + 66$$

in which G" is the loss shear modulus expressed in MPa and G* is the complex shear modulus expressed in MPa.

The abrasion resistance has been determined according to DIN 53516.

Preparation of Copolymer A1

A stainless steel reaction vessel provided with a stirrer and having a capacity of 30 l was charged with 22 l of cyclohexane and heated to a temperature of 45° C. Then, a starting mixture of 122 g of styrene and 85 g of 1,3-butadiene, which also contained 1-tert-butoxy-2-n-butoxyethane (26.7 ml), was dissolved in the cyclohexane. The copolymerization was initiated by addition of sec-butyllithium (14.3 mmol), thus simultaneously titrating impurities and initiating the polymerization. This initiation was immediately followed by gradual addition of a mixture of 750 g of styrene and 1750 g of butadiene over a period of 300 min.

After the gradual addition of the mixture of monomers the active polymer chains were terminated by addition of diethyl adipate in an amount stoichiometric with respect to the amount of sec-butyllithium. The coupling reaction was continued for 30 min. The polymers were stabilized by adding 0.6% by weight of 2,6-di-tert-butyl-p-cresol, isolated by means of steam coagulation and dried at sub-atmospheric pressure.

Preparation of Copolymers B1 and B3

A stainless steel reaction vessel provided with a stirrer and having a capacity of 10 l was charged with 6.6 l of cyclohexane and heated to a temperature of 70° C. Then, a starting mixture of 93.6 g of styrene and 29.3 g of 1,3-butadiene was dissolved in the cyclohexane. The copolymerization was initiated by addition of sec-butyllithium (5.9 mmol), thus simultaneously titrating impurities and initiating the polymerization. This initiation was immediately followed by gradual addition of a mixture of 180 g of styrene and 820 g of butadiene over a period of 180 min.

After the gradual addition of the mixture of monomers the active polymer chains were terminated by addition of diethyl adipate in an amount stoichiometric with respect to the amount of sec-butyllithium. The coupling reaction was continued for 30 min. The polymers were stabilized by adding 0.6% by weight of 2,6-di-tert-butyl-p-cresol, isolated by means of steam coagulation and dried at sub-atmospheric pressure.

Two batches were prepared in this manner, referred to hereinafter as "B1" and "B3".

Preparation of Polymer B2

A stainless steel reaction vessel provided with a stirrer and having a capacity of 30 l was charged with 20 l of cyclohexane and heated to a temperature of 70° C. Then, 1000 g of 1,3-butadiene was dissolved in the cyclohexane. The polymerization was initiated by addition of sec-butyllithium (13.2 mmol), thus simultaneously titrating impurities and initiating the polymerization. This initiation was immediately followed by gradual addition of 1500 g of butadiene over a period of 60 min.

After the gradual addition of monomer the polymerization was allowed to proceed for 60 min. Then, the active polymer chains were terminated by addition of diethyl adipate in an amount stoichiometric with respect to the amount of sec-butyllithium. The coupling reaction was continued for 30 min. The polymers were stabilized by adding 0.6% by weight of 2,6-di-tert-butyl-p-cresol, isolated by means of steam coagulation and dried at sub-atmospheric pressure.

Preparation of Copolymer AX

A stainless steel reaction vessel provided with a stirrer and having a capacity of 10 l was charged with 6.6 l of cyclohexane. Then, a mixture of 180 g of styrene and 820 g of butadiene which also contained 2.3 ml of 1-tert-butoxy-2-n-butoxyethane, was dissolved in the cyclohexane. The polymerization was initiated by addition of sec-butyllithium (4.8 mmol), thus simultaneously titrating impurities and initiating the polymerization, and carried out at a temperature of 25° C.

The polymerization was allowed to proceed for 720 min. Then, the active polymer chains were terminated by addition of diethyl adipate in an amount stoichiometric with respect to the amount of sec-butyllithium. The coupling reaction was continued for 30 min. The polymers were stabilized by adding 0.6% by weight of 2,6-di-tert-butyl-p-cresol, isolated by means of steam coagulation and dried at sub-atmospheric pressure.

Preparation of Copolymer AY

A stainless steel reaction vessel provided with a stirrer and having a capacity of 27.5 l was charged with 22 l of cyclohexane and heated to a temperature of 45° C. Then, a starting mixture of 900 g of styrene and 2 g of 1,3-butadiene was dissolved in the cyclohexane, followed by addition of 1-tert-butoxy-2-n-butoxyethane (24 ml, 1000 parts per million by weight). The copolymerization was initiated by addition of sec-butyllithium (18.3 mmol), thus simultaneously titrating impurities and initiating the polymerization. This initiation was immediately followed by gradual addition of 2098 g of butadiene over a period of 150 min, followed by allowing the mixture to polymerize for a further 30 min. Then, the active polymer chains were terminated by addition of diethyl adipate in an amount stoichiometric with respect to the amount of sec-butyllithium. The coupling reaction was continued for 30 min. The polymers were stabilized by adding 0.6% by weight of 2,6-di-tert-butyl-p-cresol, isolated by means of steam coagulation and dried at sub-atmospheric pressure.

Preparation of Copolymer BX

A stainless steel reaction vessel provided with a stirrer and having a capacity of 20 l was charged with 15 l of cyclohexane and heated to a temperature of 70° C. Then, a starting mixture of 300 g of styrene and 575 g of butadiene was dissolved in the cyclohexane. The copolymerization was initiated by addition of sec-butyllithium (5.6 mmol), thus simultaneously titrating impurities and initiating the polymerization. Ten minutes after the initiation followed a gradual addition of 125 g of butadiene over a period of 13 min, followed by allowing the mixture to polymerize for a further 28 min. Then, the active polymer chains were terminated by addition of diethyl adipate in an amount stoichiometric with respect to the amount of sec-butyllithium. The coupling reaction was continued for 30 min. The polymers were stabilized by adding 0.6% by weight of 2,6-di-tert-butyl-p-cresol, isolated by means of steam coagulation and dried at sub-atmospheric pressure.

A few properties of polymers A1, B1, B2, B3, AX, AY and BX are stated in Table 1 hereinafter. Table 1 shows that polymers A1, AX and AY comply with the requirements of styrene content, vinyl content and $T_g$ of copolymer A and that polymers B1, B2, B3 and BY comply with these three requirements for polymer B which are present in the compositions according to the invention.

TABLE 1

| Polymer | content, % by weight of | | | | apparent mol. weight [1] before coupling | coupling efficiency, % | $T_g$, °C. |
|---|---|---|---|---|---|---|---|
| | styrene[2] | vinyl[3] | trans[3] | cis[3] | | | |
| A1 | 31 | 74 | 15 | 11 | 330,000 | 58 | −2 |
| B1 | 17 | 10 | 55 | 35 | 300,000 | 74 | −75 |
| B2 | 0 | 10 | 50 | 40 | 430,000 | 71 | −93 |
| B3 | 16 | 10 | 54 | 36 | 300,000 | 76 | −74 |
| AX | 18 | 80 | 11 | 9 | 380,000 | 50 | −15 |
| AY | 29 | 77 | 13 | 10 | 176,000 | 62 | −16 |
| BX | 18 | 10 | 55 | 35 | 290,000 | 74 | −92 |

[1] Determined according to gel permeation chromatography calibrated against polystyrene samples.
[2] Calculated on total polymer.
[3] Calculated on butadiene portion.

Copolymers A1, B1 and B3 are true random copolymers having a constant average styrene content throughout the polymer molecule, i.e. the styrene content of successive incremental portions of the molecule is substantially constant throughout. In contradistinction hereto, the styrene content of successive incremental portions of the molecule of copolymer AX become progressively larger, copolymer AX not complying with the requirement of the differential content of styrene over the polymer chain which is less than five percentage points, as determined by monomer conversion. Also, copolymers AY and BX do not comply with the latter requirement.

EXAMPLES 1 AND COMPARATIVE EXPERIMENTS A-E

Seven elastomeric compositions were produced from the polymers A1, B1, B2, B3, AX, AY and BX and from Dutrex 729 extender oil, using the weight ratios stated in Table 2. This table also states the Mooney viscosity of the mixtures. The elastomeric compositions contained 37.5 parts by weight of the extender oil on 100 parts by weight of polymer. Elastomeric compositions 1 and 2 are according to the present invention, elastomeric compositions 3-7 are not.

Table 2

| Elastomeric composition | Components and weight ratio | Mooney viscosity ML/(1 + 4), 100° C. |
|---|---|---|
| 1 | B1/A1 60:40 | 33 |
| 2 | B2/A1 70:30 | 47 |
| 3 | B3/AX 60:40 | 41 |
| 4 | BX/AX 60:40 | 46 |
| 5 | BX/AY 60:40 | 43 |
| 6 | B3/AY 60:40 | 36 |
| 7 | BX/A1 60:40 | 43 |

Seven vulcanized elastomeric compositions were produced by using the elastomeric compositions 1-7 according to the compounding recipe shown in Table 3 and using optimum cure time at 160° C. according to method ASTM D 2084.

TABLE 3

| Ingredient | Parts by weight |
|---|---|
| Elastomeric composition | 137.5 |
| Zinc oxide | 3.0 |
| Stearic acid | 2.0 |
| Santoflex 13 | 1.0 |
| Carbon black ISAF N220 | 95.0 |
| Dutrex 729 | 12.5 |
| Sulphur | 2.0 |
| Santocure (CBS) | 1.5 |

Analytical data on the seven vulcanized elastomeric compositions are presented in Table 4. Examples 1 and 2 are according to the present invention, Comparative Experiments A-E are not.

TABLE 4

| Example | Comp. Experiment | Vulcanized elastomeric comp. obtained from elastomeric comp. No. | Rolling resistance Rc tan δ at 50° C. | | Wet grip performance tan δ at 0° C. | Abrasion, mm$^3$ abraded material | Winter performance, Shore A hardness at minus 10° C. |
|---|---|---|---|---|---|---|---|
| 1 | | 1 | 121 | 0.33 | 0.36 | 134 | 68 |
| 2 | | 2 | 112 | 0.27 | 0.27 | 89 | 66 |
| | A | 3 | 119 | 0.31 | 0.28 | 126 | 76 |
| | B | 4 | 137 | 0.38 | 0.22 | 144 | 71 |
| | C | 5 | 154 | 0.45 | 0.18 | 114 | 78 |
| | D | 6 | 132 | 0.37 | 0.23 | 128 | 74 |
| | E | 7 | 135 | 0.36 | 0.26 | 128 | 71 |

Table 4 shows that the vulcanized elastomeric compositions obtained in Examples 1 and 2 possess a considerably lower Shore A hardness at minus 10° C., and therefore a correspondingly better winter performance, than those obtained in Comparative Experiments A-E. This considerable improvement is obtained whilst maintaining a low rolling resistance, a high wet grip performance and a high resistance against abrasion. Furthermore, the vulcanized compositions of Comparative Experiments B-E have a relatively high rolling resistance and those of Comparative Experiments B, C and D also have a relatively low wet grip performance.

What is claimed is:

1. An elastomeric composition suitable for use in the tread portion of pneumatic tire, said composition comprising:
   (1) from 10 to 90% by weight of a copolymer A of a mono-aromatic vinyl compound and a conjugated diene and having a content of mono-aromatic vinyl compound in the range of from 10 to 40% by weight, a vinyl content in the conjugated diene units of at least 50% by weight, calculated on total conjugated diene units, and a glass transition temperature above minus 35° C., and
   (2) from 90 to 10% by weight of a polymer B which is a homopolymer of a conjugated diene or a copolymer of a mono-aromatic vinyl compound and a conjugated diene, said polymer B containing less than 25% by weight of mono-aromatic vinyl compound and having a vinyl content in the conjugated diene units of less than 25% and a glass transition temperature below minus 55° C., said percentages by weight of copolymer A and polymer B being calculated on the total of A and B, and copolymer A and polymer B, if present as a copolymer, having a differential content of the aromatic vinyl compound over the polymer chain which varies less than five percentage points; as determined by monomer conversion.

2. The elastomeric composition as claimed in claim 1 in which the differential content of the mono-aromatic vinyl compound over the polymer chain is less than two percentage points.

3. An elastomeric composition as claimed in claim 1 or 2 which contains in the range of from 20 to 50% by weight of copolymer A and 80 to 50% by weight of polymer B.

4. An elastomeric composition as claimed in claim 1 in which the mono-aromatic vinyl compound is styrene and the conjugated diene is 1,3-butadiene.

5. An elastomeric composition as claimed in claim 1 in which at least a portion of copolymer A and of polymer B, if present as a copolymer, is a coupled copolymer, coupled by means of a coupling agent.

6. An elastomeric composition as claimed in claim 1 in which the glass transition temperature of copolymer A is in the range of from minus 25° C. to plus 25° C. and that of polymer B below minus 65° C.

7. An unvulcanized elastomeric composition comprising a blend of an elastomeric composition as claimed in claim 1 with vulcanization compounding ingredients.

8. A tire whose tread has been formed by vulcanizing an elastomeric composition as claimed in claim 7.

* * * * *